United States Patent
Landry et al.

(10) Patent No.: US 7,548,799 B2
(45) Date of Patent: Jun. 16, 2009

(54) POWERED DEVICE INCLUDING A DETECTION SIGNATURE RESISTOR

(75) Inventors: D. Matthew Landry, Austin, TX (US); Russell J. Apfel, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 203 days.

(21) Appl. No.: 11/492,367

(22) Filed: Jul. 25, 2006

(65) Prior Publication Data

US 2008/0024106 A1   Jan. 31, 2008

(51) Int. Cl.
*G06F 1/26* (2006.01)

(52) U.S. Cl. .................. 700/297; 324/533; 323/267

(58) Field of Classification Search ......... 713/300–330, 713/297; 324/530–534; 323/267, 280, 282, 323/283, 284, 277; 327/535–541
See application file for complete search history.

(56) References Cited

U.S. PATENT DOCUMENTS

| | | | |
|---|---|---|---|
| 5,004,970 A | 4/1991 | Barou | 323/277 |
| 6,184,744 B1 | 2/2001 | Morishita | 327/541 |
| 6,836,472 B2 * | 12/2004 | O'Toole et al. | 370/335 |
| 6,909,320 B2 | 6/2005 | Chan et al. | 327/541 |
| 6,996,458 B2 * | 2/2006 | Pincu et al. | 700/297 |
| 7,071,664 B1 | 7/2006 | Teggatz et al. | 323/280 |
| 7,145,315 B2 | 12/2006 | Wang | 323/282 |
| 7,170,265 B2 | 1/2007 | Whittaker | 323/267 |
| 7,194,037 B1 * | 3/2007 | Sutardja | 375/258 |
| 7,378,824 B2 | 5/2008 | Chuang et al. | 323/282 |
| 2006/0164098 A1 * | 7/2006 | Su | 324/534 |

* cited by examiner

*Primary Examiner*—Rajnikant B Patel
(74) *Attorney, Agent, or Firm*—Westman, Champlin & Kelly, P.A.; R. Michael Reed (57) ABSTRACT

A method is provided that includes receiving a detection voltage at a powered device from a powered network, applying the detection voltage to an external resistor to provide a detection signature to the powered network, and applying a reference voltage to the external resistor to generate a reference current after the detection signature has been provided to the powered network.

19 Claims, 5 Drawing Sheets

POWERED DEVICE INCLUDING A DETECTION SIGNATURE RESISTOR

FIELD OF THE DISCLOSURE

The present disclosure is generally related to powered devices in Power over Ethernet networks, and more particularly to powered devices including a detection signature resistor.

BACKGROUND

Power over Ethernet (PoE), which is outlined in IEEE Std 802.3™-2005 clause 33 (the PoE standard), refers to a technique for delivering power and data to an electronic device via a network cable, such as a twisted pair Ethernet cable. In a PoE system, power sourcing equipment (PSE) provides a power supply to electronic devices, which may be referred to as powered devices, via an Ethernet cable. PoE eliminates the need for a separate power source to deliver power to attached powered devices. Such powered devices may include voice over Internet protocol (VoIP) telephones, wireless routers, security devices, field devices to monitor process control parameters, data processors, and the like.

The PoE standard specifies a detection process for detecting a PoE powered device that is coupled to the PSE before supplying power via the Ethernet cable. To perform detection, the PSE provides a DC voltage (within a range of 2.8 to 10 Volts DC) on pairs of wires of the Ethernet cable and monitors a received current (Amps) or a received voltage (V) to detect a resistance within an expected range (approximately 25K-ohms). The PSE determines the powered device's presence using a measured Volt-Amp (VA) slope related to the powered device's voltage/current signature. If the PSE does not detect a valid resistance, the PSE does not apply power to the Ethernet port assigned to the electronic device.

In general, the PoE standard specifies a particular detection signature, which may be generated using a precision resistor. Conventional integrated circuit fabrication processes make it difficult to reliably produce an integrated resistor having a resistance with sufficient precision to provide the appropriate detection signature under potential operating conditions. When using a precise external resistor, the integrated circuit includes at least one pin to couple the integrated circuit to the external resistor. Each pin of an integrated circuit has a silicon cost, a packaging cost, and a testing cost, and unnecessary or avoidable use of a pin is undesirable. Therefore, there is a need for a reduced cost powered electronic device.

SUMMARY

In a particular embodiment, a method is provided that includes receiving a detection voltage at a powered device from a powered network, applying the detection voltage to an external resistor to provide a detection signature to the powered network, and applying a reference voltage to the external resistor to generate a reference current after the detection signature has been provided to the powered network.

In another particular embodiment, a powered device includes an interface that is responsive to a powered network, a first node that is responsive to an external resistor, and a switch to selectively couple the first node to a voltage supply terminal. The powered device further includes a power over Ethernet (PoE) detection circuit device responsive to a detection voltage from the interface and to selectively activate the switch to provide a detection signature via the first node. Additionally, the powered device includes a reference current generator that is responsive to the first node to generate a reference current related to the external resistor when the switch is inactive.

In still another particular embodiment, a circuit device includes a first node responsive to an external circuit element, a detection controller to detect a first process and to apply a first voltage to the first node responsive to detection of the first process, and a reference current generator. The reference current generator applies a second voltage to the first node to generate a reference current related to the external circuit element after the first process is completed.

In yet another particular embodiment, a power over Ethernet powered device includes a dual-use pin responsive to an external circuit component, first logic to apply a first voltage to the dual-use pin during a first process, and second logic to apply a second voltage to the dual-use pin after the first process is complete. In one embodiment, the second voltage is applied to the dual-use pin to generate a reference current related to the external component.

DETAILED DESCRIPTION OF THE DRAWINGS

Figure 1:
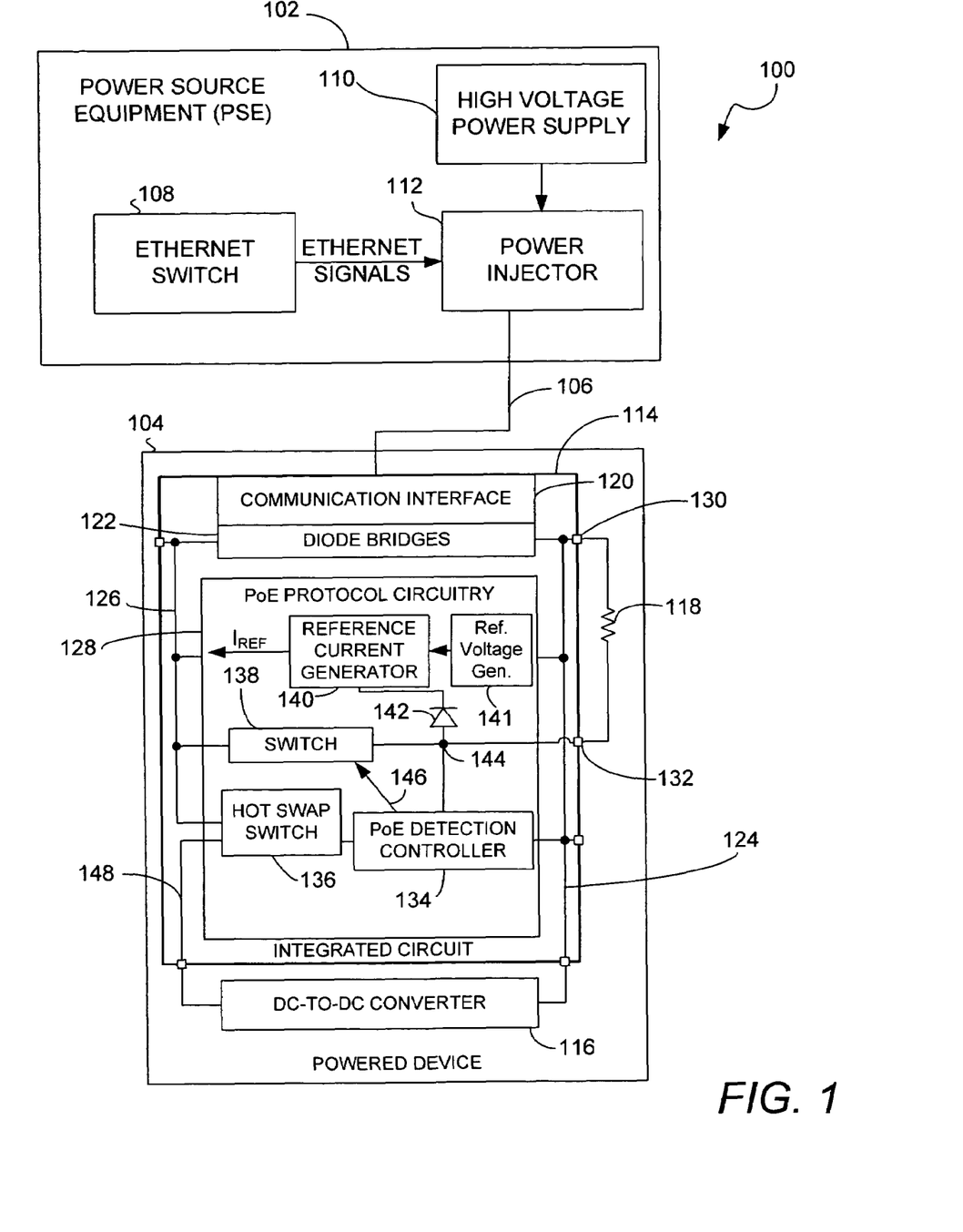
FIG. 1 is a block diagram of a particular illustrative embodiment of a power over Ethernet (PoE) system including a powered device with a dual-use pin and including a PoE detection controller and a reference current generator.

FIG. 1 is a block diagram of a particular illustrative embodiment of a power over Ethernet (PoE) system 100 including a powered device 104 with a reference current generator 140. The system 100 includes power sourcing equipment (PSE) 102 and a powered device 104 communicatively coupled by a network cable 106, such as a twisted pair CAT5e Ethernet cable. The PSE 102 may include an Ethernet switch 108, a high voltage power supply 110, and a power injector 112. In general, though only a single powered device 104 is shown, it should be understood that the PSE 102 may be coupled to multiple powered devices and may provide power and data to each of the multiple powered devices. The PSE 102 includes a plurality of nodes, and each of the plurality of nodes may be coupled to a powered device, such as the powered device 104, by a network cable, such as the network cable 106. Additionally, it should be understood that multiple electronic devices may be coupled to the PSE 102 and that some of the electronic devices may not be adapted to receive power via the network cable 106.

The powered device 104 is adapted to derive power and to receive data from the network cable 106. The powered device 104 includes an integrated circuit 114, a DC-to-DC converter 116, an external resistor 118, and load circuitry (not shown).

The load circuitry may be coupled to outputs of the DC-to-DC converter 116 to receive a regulated supply voltage. The integrated circuit 114 includes a communication interface 120, diode bridges 122, a first voltage supply terminal 124, a second voltage supply terminal 126, a third voltage supply terminal 148, power over Ethernet (PoE) protocol circuitry 128, and pins 130 and 132. The PoE protocol circuitry 128 includes a PoE detection controller 134, a hot swap switch 136, a switch 138, a reference current generator 140, a reference voltage generator 141, and an isolating diode 142.

The communication interface 120 may include transformers with center taps coupled to wire pairs of the network cable 106, and the center taps may be coupled to inputs of the diode bridges 122 to provide a common mode input voltage to the diode bridges 122. Alternatively, the communication interface 120 may simply couple wire pairs of the network cable 106 to the inputs of the diode bridges 122. The diode bridges 122 provide a rectified power supply to the first and second voltage supply terminals 124 and 126. The PoE protocol circuitry 128 may be coupled between the first and second voltage supply terminals 124 and 126. The external resistor 118 is coupled between the pins 130 and 132. The pin 130 may be coupled to the PoE detection controller 134, which may provide control signals to the hot swap switch 136 to couple the second voltage supply terminal 126 to the third voltage supply terminal 148. Additionally, the PoE detection controller 134 may provide control signals 146 to activate switch 138. The PoE controller 134 is also coupled to the reference current generator 140 via a node 144 and via the diode 142.

In operation, the PSE 102 performs a detection process to detect a powered device 104 attached to the network cable 106 and associated with a node of the Power Injector 112. In response to the detection process, the PoE detection controller 134 of the powered device 104 generates a control signal 146 to selectively activate the switch 138 to pull the node 144 to a voltage level that is approximately equal to a voltage level of the second voltage supply terminal 126 (which may be a negative voltage supply terminal). The voltage level at node 144 negatively biases the diode 142, isolating the reference current generator 140 from the node 144 and from the external resistor 118. With the switch 138 active, the external resistor 118 is applied across the first and second voltage supply terminals 124 and 126 to provide a detection signature to the PSE 102. Generally, the PoE standard specifies that the detection resistor, such as the external resistor 118, should have a nominal resistance of approximately 25K-ohms.

Once the detection process is complete, the PoE detection controller 134 deactivates the switch 138 via control signal 146, which causes the voltage level at node 144 to rise, forward biasing the diode 142 and coupling the reference current generator 140 to the external resistor 118 via the pin 132. The reference current generator 140 may utilize a reference voltage from the reference voltage generator 141 to establish a voltage differential between a voltage level of the first voltage supply terminal 124 and the reference voltage, thereby causing current to flow through the external resistor 118. The resulting current may be utilized by the reference current generator 140 to generate a reference current to other parts of the integrated circuit 114. The reference current may thus be dependent on the external resistor 118, allowing a controllable reference voltage to be utilized to generate the reference current.

In a particular embodiment, the node 144 is responsive to an external circuit element, such as the illustrated external resistor 118. The PoE detection controller 134 is adapted to detect a first process and to apply a first voltage to the node 144 in response to the first process. The first process may be, for example, a powered device detection process initiated by the PSE 102. Alternatively, the first process may be a device classification process, or an operating mode other than a normal operating mode. A second process may refer to a normal operating mode. The reference current generator 140 applies a second voltage to the node 144 to generate a reference current ($I_{REF}$) related to the external circuit element (e.g. resistor 118) when the first process is completed. Since the node 144 is coupled to the pin 132, a voltage applied to the node 144 is applied to the pin 132 and to the external circuit element, such as the resistor 118 via the pin 132.

By switching the node 144 using the switch 138, the pin 132 allows the external resistor 118 to serve a dual purpose as both a detection resistor for providing a detection signature to the PSE 102 and to provide a substantially fixed reference current ($I_{REF}$). Moreover, the powered device 104 makes use of the external resistor 118 even after the PSE detection process is complete. Since the external resistor 118 is used according to the PoE standard to provide a reliable detection signature, the PoE protocol circuitry 128 makes it possible to reuse the external resistor 118 when it is not being used for PoE detection, thereby increasing efficiency of use of the external resistor 118 and lowering the cost per function of both the pin 132 and the external resistor 118.

In general, the pin 132 may be understood to provide a dual-use, allowing an external circuit component, such as the external resistor 118, to be used to perform more than one function. As described above, for example, by applying a first voltage to the pin 132, the integrated circuit 114 may bias the external resistor 118 to draw a desired current and to provide a detection signature to the PSE 102. After the detection signature has been provided to the PSE 102, a second voltage may be applied to the pin 132, reusing the pin 132 to bias the external resistor 118 to generate a reference current. Thus, the pin 132 may be a dual-use pin that allows a passive external component, such as the resistor 118, to be utilized for more than one function.

It should be understood that while the external circuit element is indicated to be an external resistor 118, the dual-use pin 132 and the switching arrangement may be utilized with other logic and with a different external circuit element, depending on the implementation. For example, the dual-use pin 132 could be utilized with an external capacitor to bias a terminal of the capacitor at a first voltage level during a first process and then at a second voltage level during a second process. In general, the dual-use pin 132 may be used with passive circuit components, such as resistors, capacitors, and inductors, with active circuit components, such as transistors, filters, amplifiers, and the like, or with any combination thereof. An example of a more general implementation is described below with respect to FIG. 4.

Figure 2:
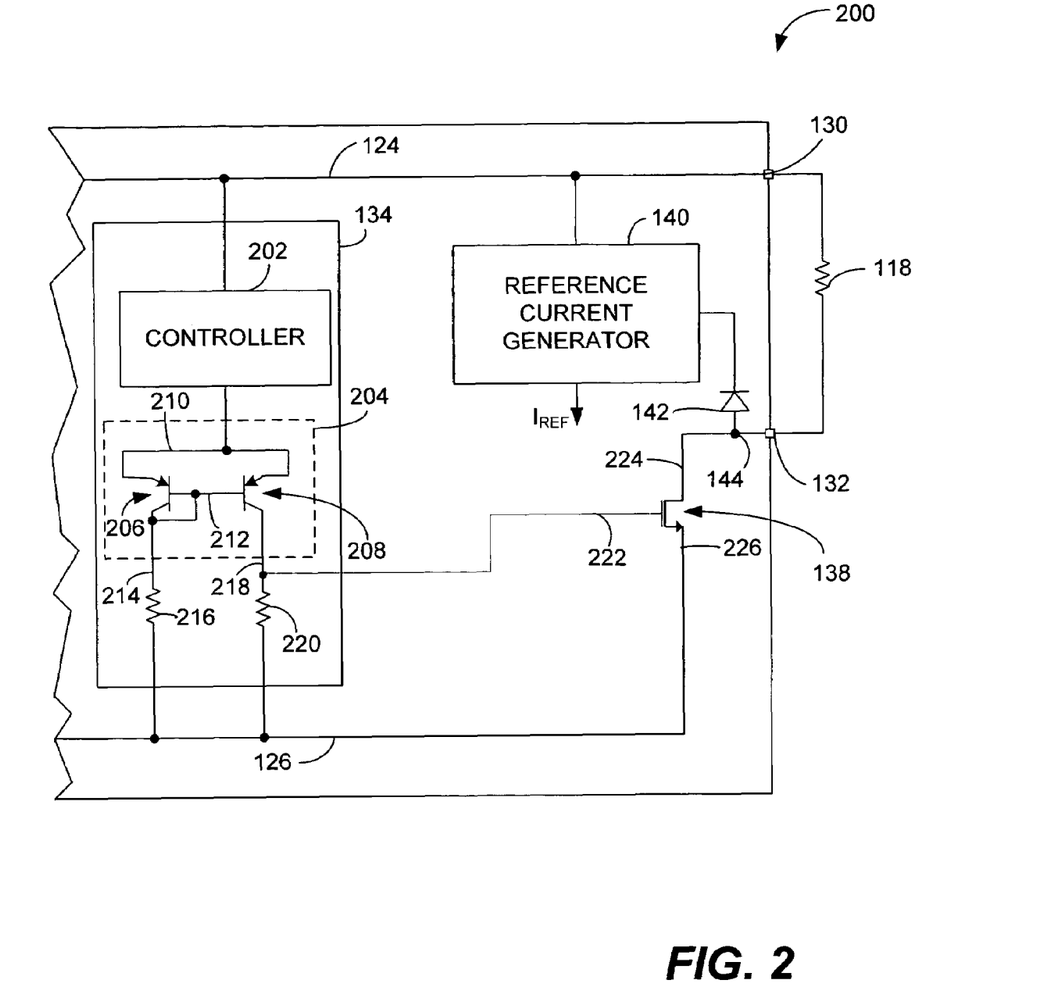
FIG. 2 is a general diagram of a particular illustrative embodiment of a portion of an integrated circuit of a powered device including an expanded view of the PoE detection controller of FIG. 1.

FIG. 2 is a general diagram of a particular illustrative embodiment of a portion 200 of an integrated circuit of a powered device including a reference current generator 140. The portion 200 of the integrated circuit includes a voltage supply terminal 124, a second voltage supply terminal 126, a PoE detection controller 134, a switch 138, a reference current generator 140, node 144, and diode 142. Additionally, the portion 200 includes pins 130 and 132 to couple an external resistor 118 to the portion 200. The PoE detection controller 134 includes a controller 202 coupled to a current mirror 204. The current mirror 204 includes transistors 206 and 208 having a common emitter 210 and a common base 212. The transistor 206 includes a collector terminal 214 that is coupled to the second voltage supply terminal 126 via a resistor 216. The transistor 208 includes a collector terminal 218 that is coupled to the second voltage supply terminal 126 via a resistor 220. The switch 138 includes a control terminal 222 coupled to the terminal 218. The switch 138 also includes a first terminal 224 coupled to the node 144 and a second terminal 226 coupled to the second voltage supply terminal 126. The node 144 is coupled to the pin 132 and to the diode 142. The diode 142 is coupled to the reference current generator 140 to produce a reference current ($I_{REF}$). In this embodiment, the PoE detection controller 134 may be an open drain pull-down circuit, such that when the controller 202 is in a PoE detection mode, the current mirror 204 and the resistors 216 and 220 cooperate to pull the node 218 to a voltage level to activate the transistor 138, pulling down the voltage at the node 144 to a voltage level of the second voltage supply terminal 126, which may be a negative voltage supply terminal ($V_{NEG}$).

In operation, as the voltage supply on the first voltage supply terminals 124 and 126 increases, the controller 202 provides the detection voltage to the common emitter 210 of the current mirror 204. The transistors 206 and 208 draw current, which increases the voltage at the control terminal 222 and activates the switch 138. The switch 138 pulls the node 144 to a voltage level that is approximately equal to a voltage level of the second voltage supply terminal 126, coupling the external resistor 118 between the first and second voltage supply terminals 124 and 126. Since the voltage at the node 144 is approximately equal to the voltage level of the second voltage supply terminal 126, the diode 142 is negatively biased, which prevents current flow through the diode 142 and isolates the reference current generator 140. In a particular embodiment, the external resistor 118 has a resistance of approximately 25.5K-ohms, a resistance of the resistor 216 is larger than 25.5K-ohms, and current through the resistors 216 and 220 is small and preferably negligible relative to current through the external resistor 118.

Once the PoE resistor detection process is complete, the controller 202 disables the current mirror 204 (such as by disconnecting the current mirror from the first voltage supply terminal 124). Current stops flowing through the current mirror 204, and the voltage at the control terminal 222 of the switch 138 falls off, deactivating the switch 138. The voltage level at the node 144 increases, forward biasing the diode 142, and allowing current to flow from pin 130, through the external resistor 118, through pin 132, through the diode 142 and into the reference current generator 140. The reference current generator 140 may utilize the input current to generate a reference current ($I_{REF}$). The reference current ($I_{REF}$) may then be distributed to other components of the integrated circuit for use as a current reference to limit the current draw by the circuit, for use as a current reference for a comparator or for other logic to detect various parameters, for use as a power supply, or for any combination thereof. In one particular embodiment, the controller 202 may include a switch that is activated by control logic.

Figure 3:
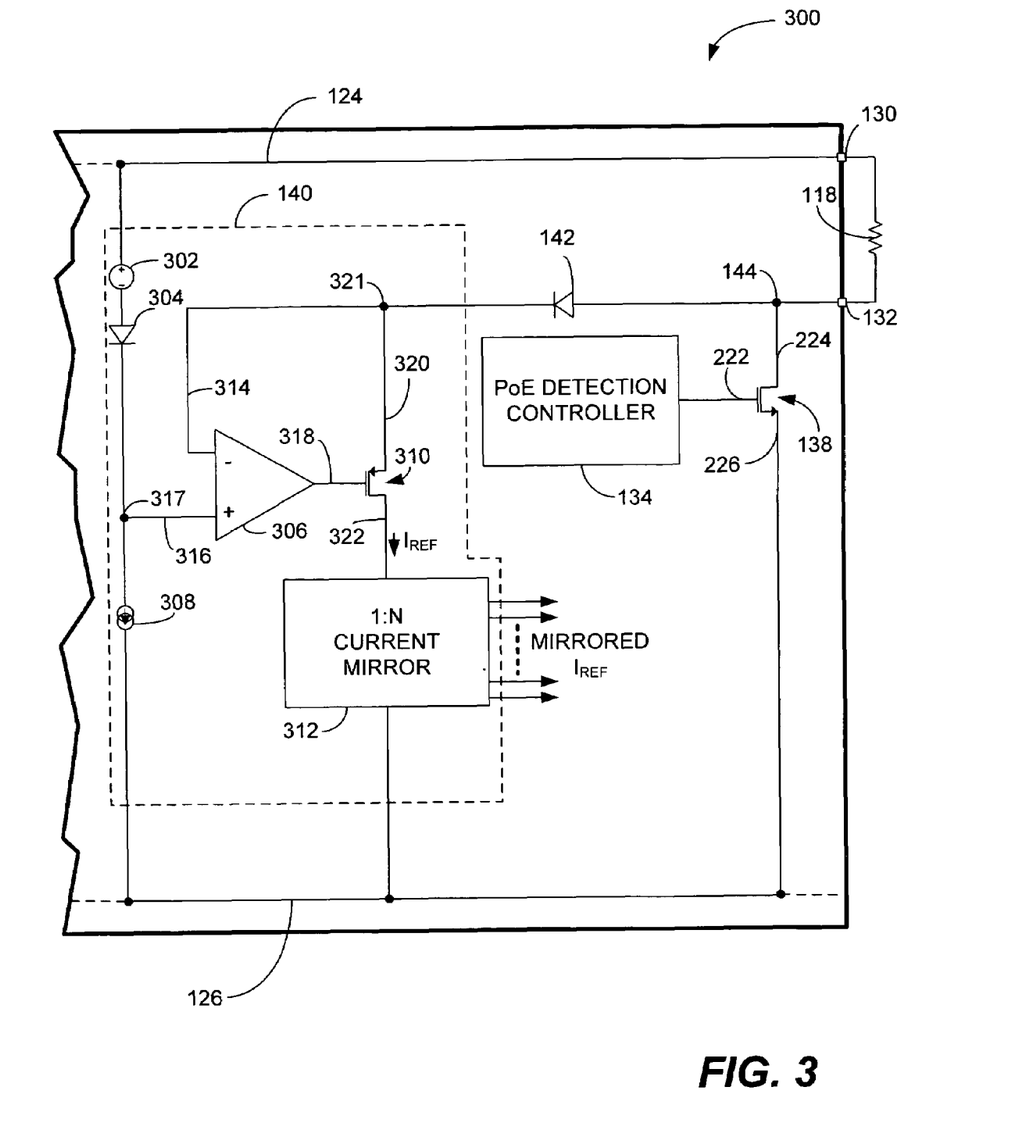
FIG. 3 is a general diagram of a particular illustrative embodiment of a portion of an integrated circuit of a powered device including an expanded view of the reference current generator of FIG. 1.

FIG. 3 is an illustrative portion 300 of an integrated circuit. The portion 300 includes a first voltage supply terminal 124, a second voltage supply terminal 126, pins 130 and 132, a PoE detection controller 134, a switch 138, a reference current generator 140, and a diode 142. An external resistor 118, such as a 25.5K-ohm resistor, is coupled between the pins 130 and 132. The node 144 is coupled to the pin 132. The switch 138 includes a first terminal 224 that is coupled to the node 144, a control terminal 222 that is coupled to the PoE detection controller 134, and a second terminal 226 that is coupled to the second voltage supply terminal 126. The diode 142 is coupled to the node 144 and to the reference current generator 140.

The reference current generator 140 includes a reference voltage source 302, a diode 304, a differential amplifier 306, a bias current source 308, a transistor 310, and a current mirror 312, which may mirror a reference current multiple times (1:N). The reference voltage source 302 includes a first terminal coupled to the first voltage supply terminal 124 and a second terminal coupled to the diode 304. The diode 304 is coupled to the bias current source 308, which is coupled to the second voltage supply terminal 126. The differential amplifier 306 includes a first input 314 coupled to the diode 142 via a node 321, a second input 316 coupled to the diode 304 via a node 317, and an output coupled to a control terminal 318 of the transistor 310. The transistor 310 also includes a first terminal 320 that is coupled to the diode 142 via the node 321, and a second terminal 322 that is coupled to the current mirror 312.

During a detection process, the PoE detection controller 134 activates the switch 138, pulling the voltage level of the node 144 down to a level that is approximately equal to a voltage on the second voltage supply terminal 126, thereby connecting the external resistor 118 between the first voltage supply terminal 124 and the second voltage supply terminal 126. The diode 142 is negative biased, isolating the reference current generator 140 from the external resistor 118. Thus, the powered device provides a detection signature primarily related to current flow across the external resistor 118.

Once the PoE detection process is complete, the PoE detection controller 134 deactivates the switch 138. A voltage level of the node 144 increases, activating the diode 142 to couple the external resistor 118 to the reference current generator 140. The reference current generator 140 receives a voltage via the diode 142 at the first input 314 of the differential amplifier 306. The differential amplifier 306 receives a reference voltage at the second input 316 and provides a differential output to the control terminal 318 of the transistor 310 to produce a reference current ($I_{REF}$) at the second terminal 322 of the transistor 310. The current mirror 312 receives the reference current ($I_{REF}$) and mirrors the current (N times) to provide the reference current to other portions of the integrated circuit.

In general, it should be understood that the reference voltage supply 302 provides a reference voltage (Reference voltage=$V_{REF}+V_{be}$, where $V_{be}$ is a base-emitter voltage) at the second input 316 of the differential amplifier 306. The feed back circuit from the node 321 to the first input 314 of the differential amplifier 306 forces the reference voltage to appear at the node 321. Since the voltage drop across the diode 142 is approximately equal to a base-emitter voltage drop, the voltage on the node 144 is forced to a voltage level that is approximately equal to $V_{REF}$. Thus, the reference current generator 140 derives a reference current by applying a reference voltage to the pin 132 to create a differential voltage across the external resistor 118 relative to a voltage level at the pin 130. The differential voltage causes current to flow across the resistor and into the current mirror 312 via the transistor 310.

Thus, the reference current generator 140 may utilize the external resistor 118, when it is not being used for PoE detection, to generate a reference current. By applying a first voltage (such as a negative voltage supply from the second voltage supply terminal 126) to the pin 132 during a first process and by applying a second voltage (such as $V_{REF}$) to the pin 132 during a second process, the pin 132 may be used for more than one function. For example, in a power over Ethernet (PoE) powered device, a PoE resistor detection process may be a first process. The first voltage may be applied to the pin 132 during the PoE resistor detection process to bias the external resistor 118 to provide a detection signature, which may be detected by a PSE, such as the PSE 102 in FIG. 1. After the detection signature has been provided, a second voltage may be applied to the pin 132 during a second process, which may be related to normal operation of a powered device. During this second process, the second voltage biases the external resistor 118 relative to, for example, a positive voltage supply terminal, to generate a current, which may be used as a reference current ($I_{REF}$).

Thus, a powered device may utilize the external resistor 118 for more than one function and take advantage of the precise external resistor 118 to generate a relatively precise reference current ($I_{REF}$). By utilizing the pin 132 for more than one function (such as for PoE detection and for reference current generation, for example), the cost of adding the pin 132 to an integrated is amortized, mitigating the need for other additional pins and for other external resistors to serve other purposes. Additionally, the cost per function of the pin 132 is reduced, thereby enhancing the efficiency of the integrated circuit design.

Figure 4:
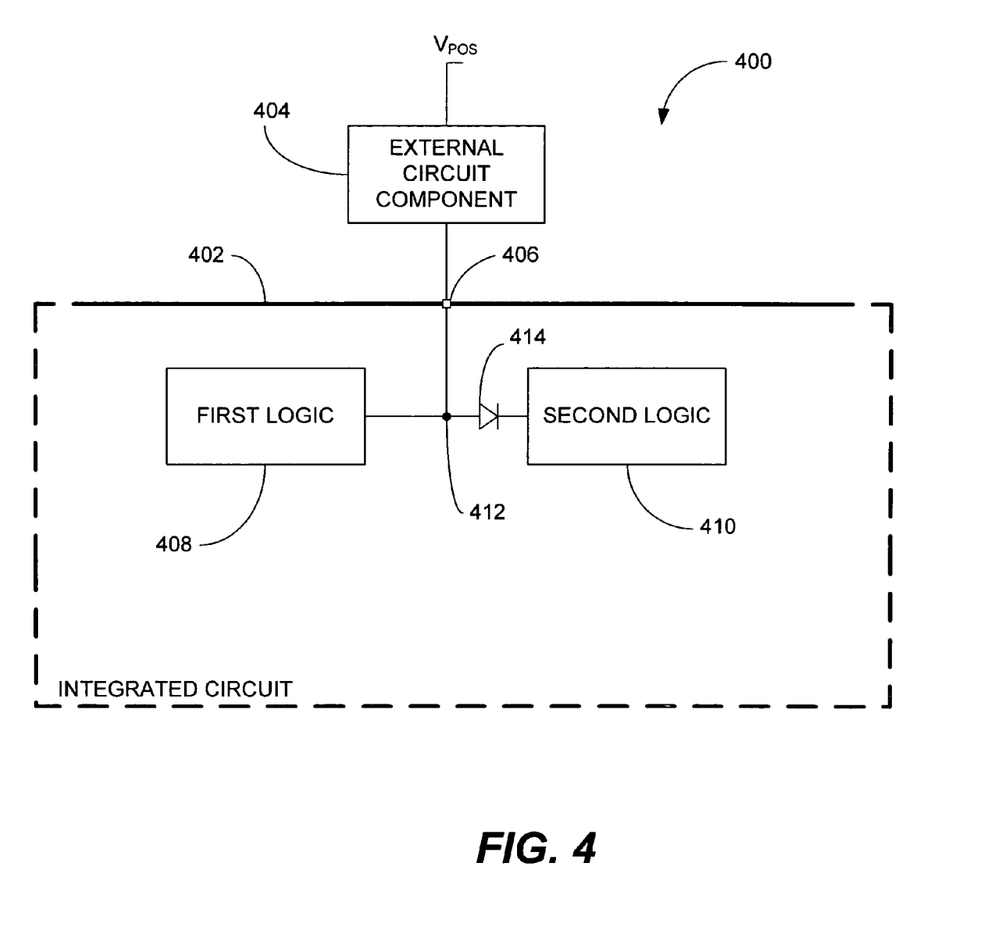
FIG. 4 is a block diagram of another particular illustrative embodiment of a portion of an integrated circuit device including a dual-use pin.

FIG. 4 is a block diagram of another particular illustrative embodiment of a portion 400 of an integrated circuit device 402. The integrated circuit device 402 is coupled to an external circuit component 404 via a pin 406. The pin 406 is responsive to the external circuit component 404. The integrated circuit device 402 includes first logic 408, second logic 410, a node 412, and a diode 414. The first logic 408 is coupled to the pin 406 via the node 412. The second logic is coupled to the pin via the node 412 and via the diode 414.

The first logic 408 applies a first voltage to the pin 406 during a first process, and the second logic 410 applies a second voltage to the pin 406 after the first process is complete. The diode 414 isolates the second logic 410 from the pin 406 during the first process.

In a particular embodiment, the first logic 408 may be an open drain pull-down circuit to pull the node 408 down to a voltage level of a negative voltage supply terminal (such as the voltage supply terminal 126 in FIGS. 1-3). In a particular embodiment, the external circuit component 404 may be a passive circuit element, such as a resistor, a capacitor, an inductor, a diode, another passive circuit element, or any combination thereof. In another particular embodiment, the external circuit component 404 may include an active circuit component, such as a transistor, logic elements, other active components, or any combination thereof. Furthermore, the isolation function provided by diode 414 may also be accomplished with other active devices such as field effect transistors (FETs), bipolar junction transistors (BJTs), and the like.

In a particular embodiment, the first process may include a powered device detection process and the first logic 408 may apply the first voltage to the pin 406 via the node 412 to generate a detection signature, which may be recognized by power sourcing equipment, such as PSE 102 in FIG. 1, to detect the presence of a power over Ethernet (PoE) powered device, for example. In an alternative embodiment, the first logic 408 may apply a first voltage to the pin 406 via the node 412 during a first process, while the second logic 410 is isolated from the pin 406 by the diode 414. When the first process is complete, the second logic 410 may apply a second voltage to the pin 406 via the diode 414 to make use of the external circuit component 404 for a second process. For example, the second logic 410 may apply a second voltage to the pin 406 to generate reference current.

In one embodiment, the first voltage may be a voltage level of a voltage supply terminal (e.g. voltage supply terminal 126 in FIGS. 1-3), which may be at ground or which may be at a negative voltage level. In this instance, the second voltage may be a voltage level that is negative relative to a voltage level of a voltage supply terminal, such as the voltage supply terminal 124 in FIGS. 1-3. The first logic 408 may include detection control logic to detect an applied detection voltage and to apply the first voltage to the pin 406 to bias the external circuit component 404 relative to the applied detection voltage to provide a detection signature. After the detection signature has been provided, the second logic 410, which may include a reference voltage generation circuit, may apply the second voltage to the pin 406 to bias the external circuit 404 relative to a voltage supply terminal ($V_{POS}$).

In a particular embodiment, the external circuit component 404 may be PoE detection resistor, such as the resistor 118 in FIG. 1. In another particular embodiment, the external circuit component 404 may be a PoE detection capacitor to provide a capacitance signature to a PSE (e.g. PSE 102 in FIG. 1) and to function as a filter when the second voltage is applied. In one embodiment, the first process may be a sleep mode and the second process may be a normal operating mode, where the external circuit component 404 includes logic to activate other components of the circuit responsive to detection of a wake up operation by the first logic 408.

In an alternative embodiment, the first logic 408 may apply a first current and the second logic 410 may apply a second current to the pin 406 to generate a voltage across an external circuit component 404, such as a resistive load.

Figure 5:
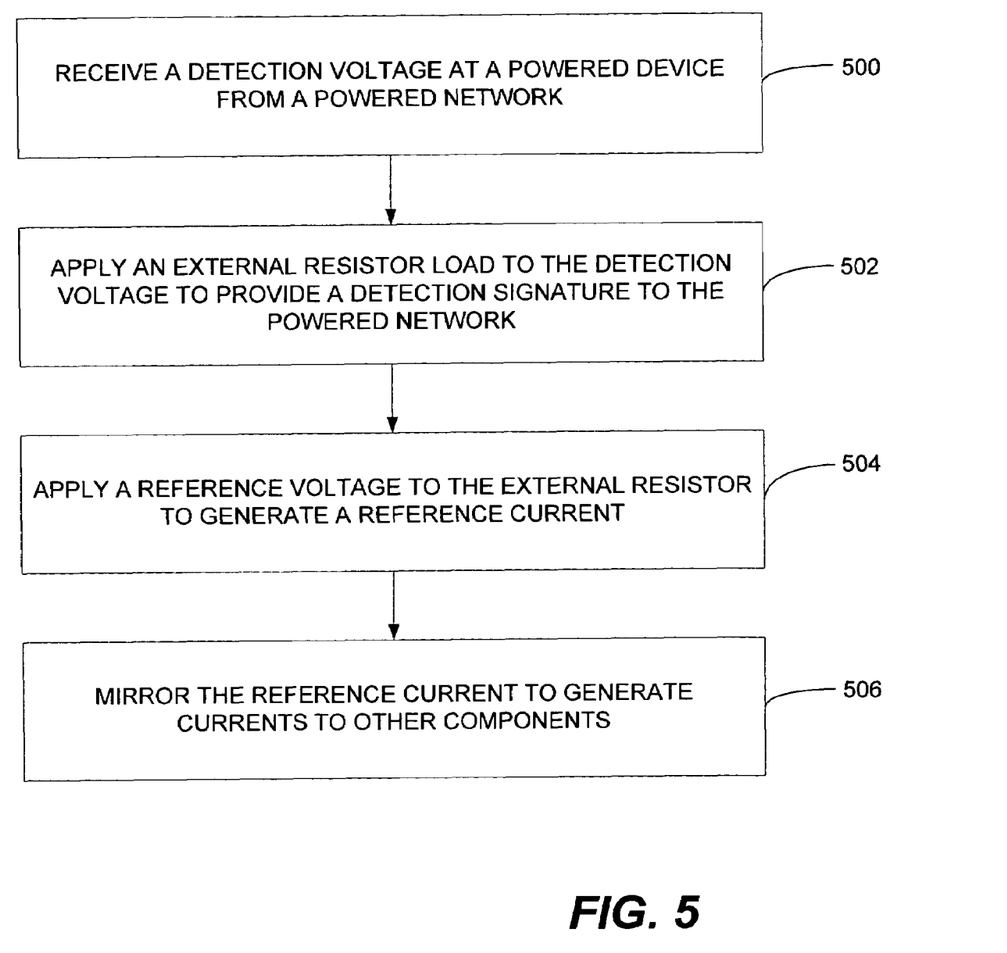
FIG. 5 is a flow diagram of a particular illustrative embodiment of a method of providing a detection signature and of generating a reference current using an external detection signature resistor.

FIG. 5 is a flow diagram of a particular illustrative embodiment of a method of generating a reference current using an external detection signature resistor. A detection voltage is received at a powered device from a powered network (block 500). An external resistor load is applied to the detection voltage to provide a detection signature to the powered network (block 502). A reference voltage is applied to the external resistor to generate a reference current (block 504). The reference current is mirrored to provide the reference current to other components of the integrated circuit (block 506). In one particular embodiment, the reference current may be a fixed current.

In a particular embodiment, the reference voltage may include an on-chip precision voltage. In another particular embodiment, the external resistor load may be coupled between a first pin that is coupled to a first voltage supply terminal and a second pin. The reference voltage may be applied to the external resistor by activating a transistor to couple the second pin to a second voltage supply terminal and by isolating a reference current generator from the second pin. In another embodiment, the reference voltage may be applied to the external resistor by deactivating the transistor to isolate the second pin from the second voltage supply and by applying the reference voltage to the second pin to provide a desired voltage differential across the external resistor to generate the reference current.

It should be understood that, though the illustrative examples provided above are directed to Power over Ethernet (PoE) enabled devices (powered devices), a dual-use pin may be incorporated in other applications to couple external circuit component(s) to an integrated circuit. The dual-use functionality, as shown in FIG. 4, may be provided using more than one logic element, such as first logic and second logic. It should also be appreciated that a multi-mode device may include additional logic responsive to the pin to provide multiple functions for a single pin. In one particular embodiment, a single external resistor may be utilized to provide a PoE detection signature in a PoE detection process, a PoE classification signature in a PoE classification process, and a reference current during normal operation. Other multiple uses are also contemplated, including switching an external capacitor, such as an input filter capacitor or a PoE detection capacitor to provide other functions, including supplemental filtering, excess-energy storage during an over-voltage event, power-up delays, and the like.

Although the present specification describes components and functions that may be implemented in particular embodiments with reference to particular standards and protocols, the invention is not limited to such standards and protocols. For example, the PoE standard represents an example of the state of the art. Such standards are periodically superseded by faster or more efficient alternatives having essentially the same functions. Accordingly, replacement standards and protocols having the same or similar functions as those disclosed herein are considered equivalents thereof.

Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving a detection voltage at a powered device from a powered network;
   applying the detection voltage to an external resistor to provide a detection signature to the powered network; and
   applying a reference voltage to the external resistor to generate a reference current after the detection signature has been provided to the powered network;
   wherein the reference current comprises a substantially fixed current.

2. The method of claim 1, further comprising:
   mirroring the reference current to provide the reference current to other components.

3. The method of claim 1, wherein the reference voltage comprises an on-chip precision voltage.

4. The method of claim 1, wherein the external resistor is coupled between a first pin responsive to a first voltage supply terminal and a second pin, wherein applying the detection voltage to the external resistor comprises:
   activating a transistor to couple the second pin to a second voltage supply terminal; and
   isolating a reference current generator from the second pin.

5. The method of claim 4, wherein applying the reference voltage comprises:
   deactivating the transistor to isolate the second pin from the second voltage supply; and
   applying the reference voltage to the second pin to provide a desired voltage differential across the external resistor to generate the reference current.

6. A powered device comprising:
   an interface responsive to a powered network;
   a first node responsive to an external resistor;
   a switch to selectively couple the first node to a voltage supply terminal;
   a power over Ethernet (PoE) detection circuit responsive to a detection voltage from the interface and to selectively activate the switch to couple the first node to the voltage supply terminal; and
   a reference current generator responsive to the first node to generate a reference current related to the external resistor when the switch is inactive;
   wherein the external resistor comprises a resistor having a resistance value that is approximately 25 K-ohms.

7. The powered device of claim 6, further comprising:
   a diode responsive to the node to isolate the reference current generator from the first node when the switch is activated.

8. The powered device of claim 6, wherein the reference current generator comprises:
   a differential amplifier including a first input to receive a reference voltage, a second input to receive feedback from a second node, and an output; and
   a transistor including a first terminal coupled to the second node, a control terminal coupled to the output, and a second terminal coupled to the voltage supply terminal.

9. The powered device of claim 8, wherein the differential amplifier applies the reference voltage to the first node to produce a reference current related to the external resistor.

10. The powered device of claim 9, further comprising a current mirror to mirror the reference current.

11. A circuit device comprising:
    a first node responsive to an external circuit element;
    a detection controller to detect a first process and to apply a first voltage to the first node responsive to detection of the first process;
    a reference current generator to apply a second voltage to the first node to generate a reference current related to the external circuit element after the first process is completed; and
    a switch including a first terminal coupled to the first node, a second terminal coupled to a voltage supply terminal, and a control terminal coupled to the detection controller;
    wherein the detection controller comprises an open drain pull-down circuit coupled to the control terminal of the switch.

12. The circuit device of claim 11, wherein the first node, the detection controller and the reference current generator are fabricated on an integrated circuit.

13. The circuit device of claim 11, wherein the first process comprises a power over Ethernet powered device detection process.

14. The circuit device of claim 11, wherein the external circuit element comprises a passive circuit element.

15. A power over Ethernet powered device comprising:
a dual-use pin responsive to an external circuit component;
first logic to apply a first voltage to the dual-use pin during a first process; and
second logic to apply a second voltage to the dual-use pin after the first process is complete;
wherein the first process comprises a powered device detection process and wherein the first logic applies the first voltage to the pin to generate a detection signature.

16. The power over Ethernet powered device of claim 15, wherein the second voltage is applied to the dual-use pin to generate a reference current related to the external circuit component.

17. The power over Ethernet powered device of claim 15, wherein the external circuit component comprises a passive circuit element.

18. The power over Ethernet powered device of claim 17, wherein the external circuit component is comprises a resistor.

19. The power over Ethernet powered device of claim 15, further comprising:
a diode to isolate the second logic from the pin during the first process.

* * * * *